Dec. 27, 1960 I. BERGKNOFF 2,966,370

DATA RECORDING SYSTEM

Filed Aug. 18, 1958 2 Sheets-Sheet 1

INVENTOR
IRWIN BERGKNOFF
BY Stanley Wolder
ATTORNEY

Dec. 27, 1960

I. BERGKNOFF 2,966,370

DATA RECORDING SYSTEM

Filed Aug. 18, 1958

2 Sheets-Sheet 2

INVENTOR
IRWIN BERGKNOFF
BY Stanley Wolder
ATTORNEY

United States Patent Office 2,966,370

Patented Dec. 27, 1960

2,966,370

DATA RECORDING SYSTEM

Irwin Bergknoff, 1221 35th Ave., Long Island City, N.Y.

Filed Aug. 18, 1958, Ser. No. 755,497

3 Claims. (Cl. 282—22)

The present invention relates generally to improvements in data recording devices and it relates more particularly to an improved bookkeeping system for simultaneously posting entries in a plurality of sheets or forms.

Many record and data keeping and bookkeeping procedures require the multiple entry of data and information into several sheets, books and forms. This is particularly true in maintaining payroll records, accounts and similar information. In the event that the volume of records do not justify the use of bookkeeping machines such data is generally copied and separately manually entered and posted into the various books and forms. This is a highly time consuming expensive and tedious procedure and often leads to costly errors due to copying mistakes.

It is thus a principal object of the present invention to provide an improved data recording device.

Another object of the present invention is to provide an improved bookkeeping system for simultaneously posting entries in a plurality of sheets and forms.

Still another object of the present invention is to provide an improved set of payroll record forms which facilitate the simultaneous and simple entry of payroll data in plurality of forms to thereby obviate the possibility of copying errors.

A further object of the present invention is to provide an improved set of payroll record forms which permits the simultaneous entry of data in a plurality of forms without the need for mechanical alignment devices.

The above and other objects of the present invention will become apparent from a reading of the following description taken in conjunction with the accompanying drawings wherein.

In a sense the present invention contemplates the provision of an improved data recording or bookkeeping system comprising a first sheet having horizontal lines dividing said sheet into vertically spaced posting sections, a second sheet superimposed upon and vertically slidable along said first sheet and having formed therein a vertical line of weakness inwardly of and parallel to a vertical edge of said second sheet and vertically spaced horizontal lines of weakness between said vertical edge and said vertical line of weakness to delineate separable tabs corresponding in height to said posting section, and a pressure responsive impression transfer member sandwiched between said first and second sheets.

In accordance with a preferred embodiment of the present invention there is provided a third sheet underlying the first sheet and having vertically spaced horizontal lines of weakness extending across the third sheet and dividing the third sheet into separable tabs of the height of the posting sections. Another pressure responsive impression transfer member is sandwiched between the first and third sheets. It should be noted that the pressure responsive transfer member, when referred to in the specification or in the claims, may be a separate sheet of carbon paper or like transfer material or may be defined by a pressure responsive impression transfer coating on the underface of the upper sheet. The top or second sheet may be provided with tab delineating lines of weakness along opposite edges thereof, and lines and legends may be imprinted on both sides of the second sheet permitting use of opposite sides thereof. In accordance with the modified form of the present invention there are provided sheets or forms which may be bank checks and which are superimposed upon the topmost second sheet and likewise provided with lines of weakness which delineate a separable tab substantially the height of the posting section.

Figure 1:
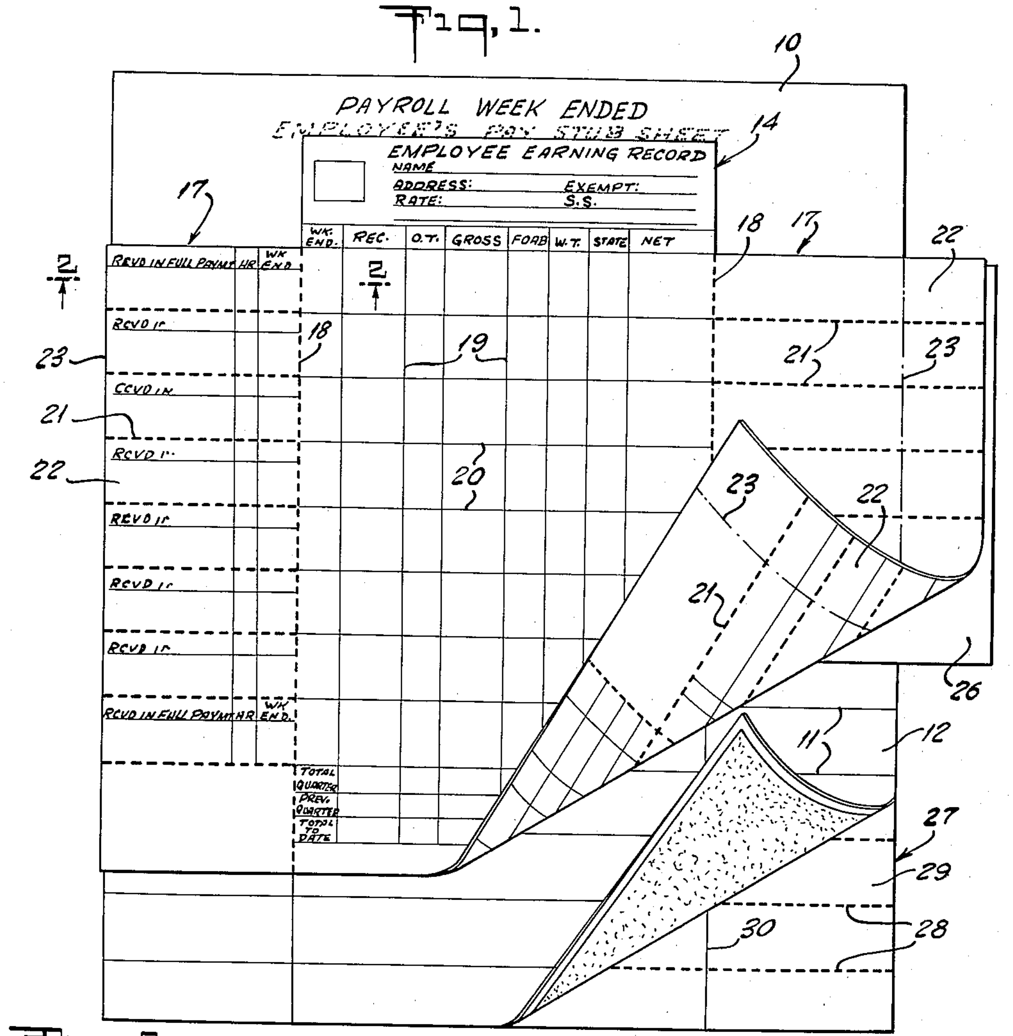
Fig. 1 is a top plan view of a payroll recording system embodying the present invention illustrated with the lower corners of the sheets turned up to show the underfaces thereof.
Figure 2:
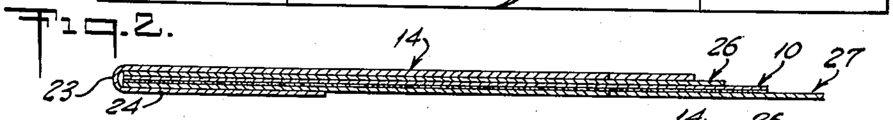
Fig. 2 is a sectional view taken along line 2—2 in Fig. 1.
Figure 3:
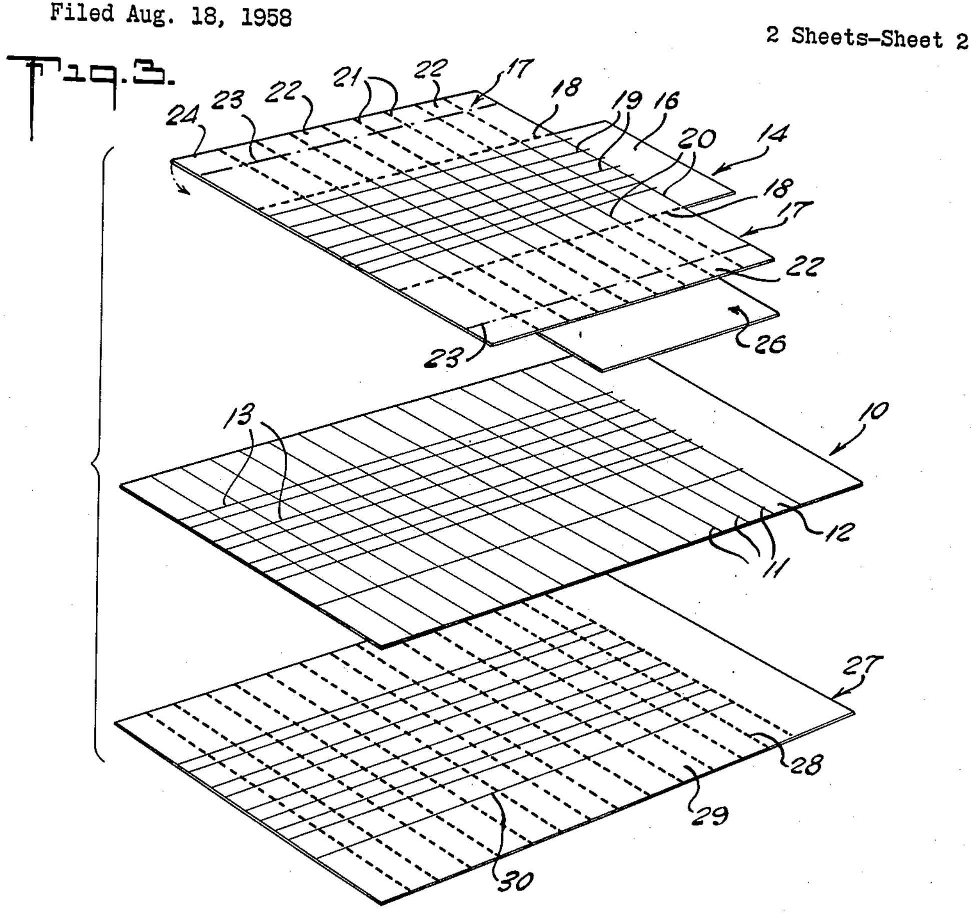
Fig. 3 is an exploded perspective view of the system illustrated in Fig. 1.

Referring now to the drawings and more particularly to Figures 1 through 3 thereof, the numeral 10 generally designates a first sheet which, in the case of a payroll system, may define the weekly payroll record. The sheet 10 has imprinted thereon a plurality of regularly vertically spaced horizontal lines 11, the space between successive lines 11 defining posting sections 12. A plurality of horizontally spaced vertical lines 13 divide the sheet and the respective posting sections 12 into vertical columns. The space above the topmost posting section 12 may include the conventional legends and information identifying the sheet 10 and the various columns delineated by the lines 13.

Superimposed upon the sheet 10 and vertically slidable relative thereto is a second sheet 14 which defines in the case of a payroll bookkeeping system the individual employee earning record. The sheet 14 includes a middle panel 16 and side panels or rectangular wings 17 extending from opposite vertical edges of the middle panel 16 and separated therefrom by vertical lines of weakness or score lines 18. The middle panel 16 is provided with vertical lines 19 which define vertical columns coinciding with the corresponding vertical columns on the underlying sheet 10 when brought into proper registry therewith. Horizontal lines 20 divide the middle section 16 into vertically spaced posting sections of the same height as a first sheet posting sections 12. Formed in each of the wings or panels 17 are vertically spaced horizontal lines of weakness or score lines 21 which are colinear with the middle section horizontal lines 20 and delineate with the vertical score lines 18 separable tabs 22, the heights of which are equal to the heights of the individual posting sections 12. A vertical fold line is formed in each of the panels 17 spaced inwardly from the outer edge thereof to form a flap 24 which may be folded under for the purpose which will be hereinafter set forth. A pressure sensitive impression transfer sheet 26 in the form of carbon paper having a bottom transfer surface is sandwiched between the first and second sheets 10 and 14.

A third sheet 27 underlies the first sheet 10 and is provided with vertically spaced horizontal score lines 28 which divide the sheet 27 into a plurality of separable tabs 29, the heights of which are equal to the posting sections 12. The sheet 27 is likewise imprinted with column defining lines 30 corresponding with the first sheet vertical lines 13. The underface of the first sheet 10 may be carbonized or a separate transfer sheet or carbon paper may be sandwiched between the first and third sheets 10 and 27.

In employing the data recording device described above, the first sheet 10 is superimposed upon the third sheet 27 with an intervening transfer member and the second sheet 14 is superimposed upon the first sheet 10 likewise with an intervening impression transfer sheet 26. The flap 24 is folded under along the line 23 to embrace the underlying sheets 10 and 27 and facilitate proper registry therewith. The sheet 14 is then slid until the upper edge of the panel 17 coincides with the upper edge of any posting section in which an entry is to be made. The necessary data is then entered into the topmost posting section of the second sheet 14 and is automatically entered in the corresponding sections of the lower sheets 10 and 27 by way of the intervening transfer members. A tab 29 is then separated for issuance to the employee and a tab 22 is separated for whatever use desired. Thus entries are simultaneously made on the employee's earning record 14, the weekly payroll sheet 10 and an issue tab 29. The next entry on the sheets 10 and 27 is made with another employee record sheet 14 which may have several entries made therein and from which the corresponding number of tabs 22 have been separated. The above procedure is followed except that the upper edge of the topmost empty posting section of the sheet 10 and the above procedure followed. The lower edges of the sheets 10 and 27 may be secured to each other to maintain registry of the posting sections 12 and tabs 29.

Figure 4:
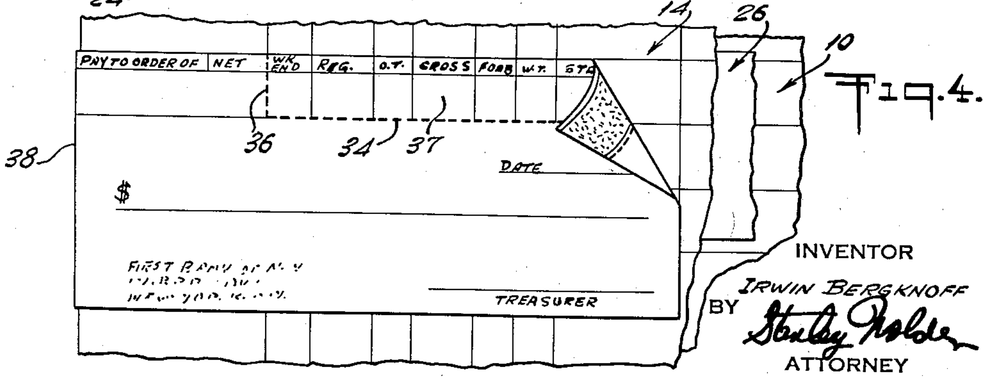
Figure 4 is a top plan view of another embodiment of the present invention with the upper corner of one of the sheets turned down, shown partially broken away for convenience of illustration.
Figure 5:
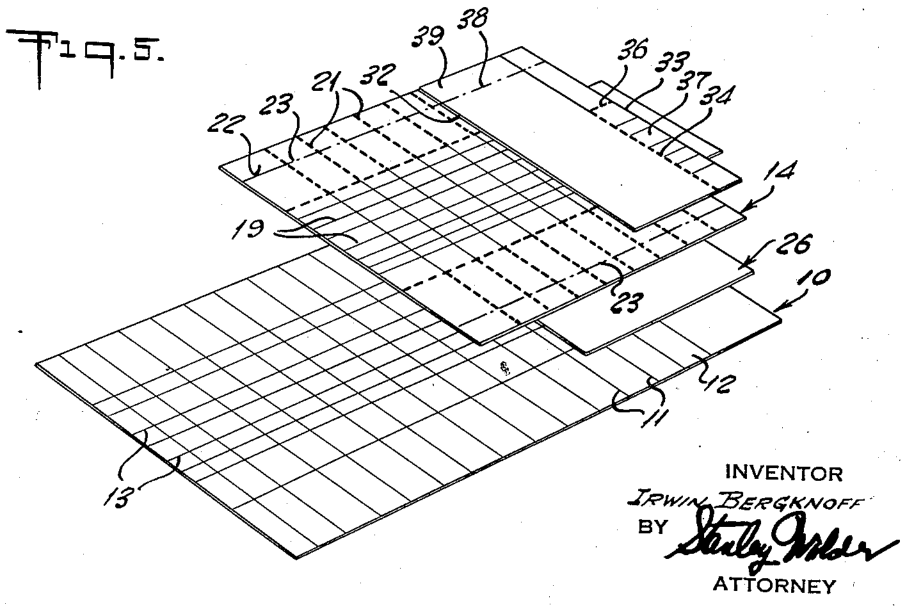
Fig. 5 is an exploded perspective view thereof.

In Figures 4 and 5 of the drawing there is illustrated another embodiment of the present invention in which there is provided a salary check 32 which includes a separable tab 33 carrying the information for the employee and thus obviates the need for the bottom or third sheet 27. The first and second sheets 10 and 14 and the transfer sheet 26 are employed as above set forth. In addition thereto, there is provided the check 32 having a horizontal score line or line of weakness 34 below the upper edge of the check 32 and a vertical line of weakness 36 which delineates with the line of weakness 34 and the edges of the check 32 a separable rectangular tab 37 having imprinted thereon legends corresponding with the respective columns on the sheets 10 and 14. The height of the tab 37 is equal to the height of a posting section 12. Formed inwardly of a slide edge of the check 32 is a fold line 38 to provide a flap 39 to permit the proper alignment of the check 32 with the sheets 10 and 14. The underface of the separable tab 37 is carbonized or provided with any suitable impression transfer surface.

In employing the system illustrated in Figures 4 and 5 of the drawing, the first and second sheets 10 and 14 are disposed in the manner previously set forth and the check 32 is superimposed upon the upper sheet 14, the tab 39 being folded under to embrace the side borders of the sheets 10 and 14. The check 32 is vertically located along the sheets 10 and 14 so that the top edge thereof coincides with the top edge of the uppermost empty posting section. The desired entries are then made and the check 32 including the tab 37 is issued to the employee.

While there has been described and illustrated preferred embodiments of the present invention, it is apparent that numerous changes and omissions may be made without departing from the spirit thereof.

I claim:

1. A data recording device comprising a lower sheet having a plurality of horizontally extending equally vertically spaced lines dividing said lower sheet into first posting sections, an upper sheet superimposed upon and vertically slideable relative said lower sheet having a plurality of horizontally extending lines vertically spaced the same distance as said vertically spaced lines on said lower sheet to provide second posting sections equal in height to said first posting sections, a pressure responsive impression transfer member interposed between said upper and lower sheets, said upper sheet having formed therein a vertical line of weakness inwardly of and parallel to a vertical edge of said upper sheet delineating a tab panel between said line of weaknes and edge and horizontal lines of weakness along said horizontal lines on said upper sheet extending from said vertical edge thereof to said vertical line of weakness, said vertical line and horizontal lines of weakness delineating a vertical column of tabs in said tab column, each tab corresponding in height to said first posting sections of said lower sheet, whereby upon severing the uppermost tab there remains a cut-out portion of said tab column, the lower side of said cut-out portion being alignable with an underlying line of said lower sheet to index said upper sheet relative said lower sheet.

2. A device as described in claim 1, said tab panel of said upper sheet having a vertical fold formed therein, said fold being positioned above the underlying edge of said lower sheet, the distal portion of said panel being folded under said lower sheet whereby said upper sheet, while being free to move vertically is horizontally indexed relative said lower sheet.

3. A device as described in claim 2 and a bottom sheet having a plurality of horizontally extending lines vertically spaced the same distance as said vertically spaced lines on said lower sheet to provide third posting sections equal in height to said first posting sections, said bottom sheet underlying said lower sheet and a pressure responsive impression transfer member interposed beween said lower and bottom sheets.

References Cited in the file of this patent

UNITED STATES PATENTS

| | | |
|---|---|---|
| 2,089,247 | Benson | Aug. 10, 1937 |
| 2,581,895 | Wilson | Jan. 8, 1952 |
| 2,625,408 | Hirsch | Jan. 13, 1953 |